F. H. VAN HOUTEN.
DOUGH ADVANCING ROLL.
APPLICATION FILED JUNE 6, 1916.
1,253,444.
Patented Jan. 15, 1918.
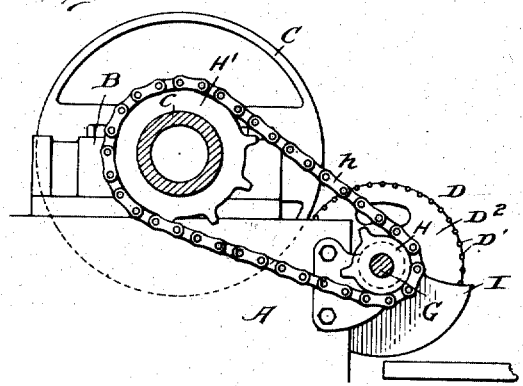
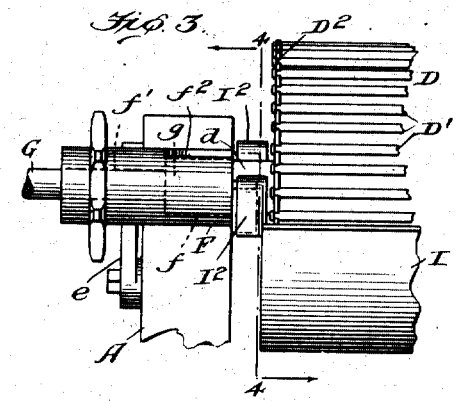
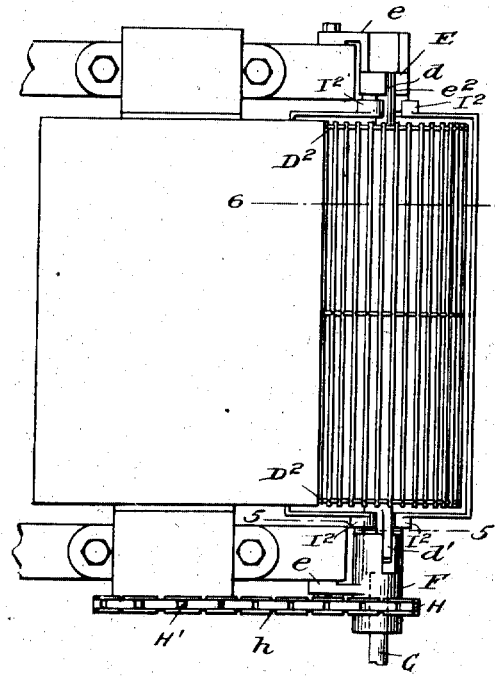
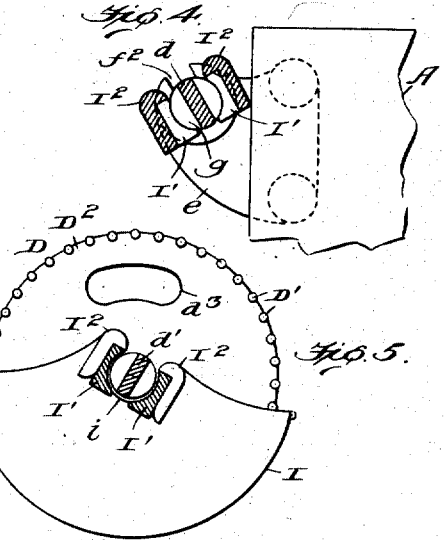
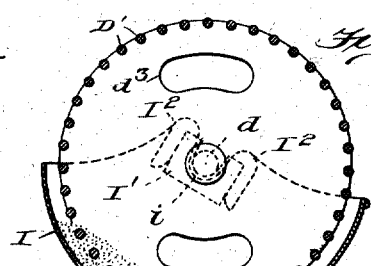

UNITED STATES PATENT OFFICE.

FRANK H. VAN HOUTEN, OF BEACON, NEW YORK, ASSIGNOR TO DUTCHESS TOOL COMPANY, OF BEACON, NEW YORK, A CORPORATION OF NEW YORK.

DOUGH-ADVANCING ROLL.

1,253,444.     Specification of Letters Patent.     Patented Jan. 15, 1918.

Application filed June 6, 1916. Serial No. 102,022.

*To all whom it may concern:*

Be it known that I, FRANK H. VAN HOUTEN, a citizen of the United States, residing at Beacon, in the county of Dutchess and State of New York, have invented certain new and useful Improvements in Dough-Advancing Rolls; and I do hereby declare the following to be a full, clear, and exact description of the same, reference being had to the accompanying drawings, forming part of this specification.

The general object of the present invention is the provision of an improved roll for advancing dough while the latter is being manipulated by dough working machinery, and to construct the roll so that it will efficiently handle the dough without danger of portions of the dough clinging to the surface of the roll. A further improvement consists in the provision of an exceedingly simple and effective means for applying a coating of flour to the dough-engaging periphery of the roll, after the dough has been fed therefrom and before a new batch of dough has been deposited on the roll, so as to present a thoroughly dry surface, which obviates all danger of the dough sticking to the roll.

Other objects of the invention will appear from the ensuing detailed description, when taken in connection with the accompanying drawings, which illustrate a structural embodiment of the invention in a preferred form. The novel features of the invention will be particularly pointed out and specified in the claims at the end of the specification.

In the drawings,—

Figure 1 is a side elevation, partly in section, of a portion of the frame of a dough dividing machine illustrating the measuring cylinder, and an advancing roll with other parts constructed in accordance with the present improvements, the advancing roll being positioned to take off batches of dough discharged from the pockets of the measuring cylinder.

Fig. 2 is a top plan view of the parts illustrated in Fig. 1.

Fig. 3 is an enlarged detail front view of the roll and the flour receptacle, the parts being shown at the driving end of the roll.

Fig. 4 is a transverse section on the line 4—4 of Fig. 3.

Fig. 5 is a detail transverse sectional view on the line 5—5 of Fig. 2, showing the method of dismounting the flour receptacle from its position beneath the roll.

Fig. 6 is a transverse section taken through the roll on the line 6—6 of Fig. 2.

Like characters of reference in the several figures indicate the same parts.

The improved roll of the present invention is particularly useful in connection with dough dividing machinery and, hence, for convenience in description, the present embodiment is a take-off roll for receiving batches of dough discharged from the pockets of a measuring head or cylinder, such, for example, as is disclosed in the dough dividing machine of my prior Patent No. 1,158,339, dated October 26, 1915. It will be understood, of course, that the present improved roll is of general utility in the art of handling plastic substances, such as dough and the like, and may be employed in almost any situation where it is desired to engage and advance dough from one place to another.

As shown in the accompanying drawing, the frame of a dough dividing machine is indicated by the letter A, the said frame being provided with suitable bearing brackets B, in which is journaled the shaft $c$, of an intermittently-rotating measuring head or cylinder C. The measuring cylinder C is provided with pockets adapted to receive batches of dough, and within the pockets are plungers which are retracted when the pockets are in one position to receive the dough fed into them and advanced when the pockets are in another position to discharge the measured batches of dough. This system of operation has been fully described in my prior Patent No. 1,158,339, and other prior patents granted to me, and, hence, needs no further description here.

The method of mounting the take-off roll D on the frame of the dough dividing machine is preferably that employed in my copending application Serial No. 75,533, filed February 1, 1916. This take-off roll is driven in accord with the intermittently rotating measuring cylinder and its purpose in the present instance is to receive the batches of dough discharged from the measuring cylinder when the pistons of the latter are advanced, and to feed the dough to a table or other part from which it can be readily removed for such further manipulation as may be necessary. At one end, the take-off roll D is equipped with a spindle $d$ of ordinary construction and at the other end with a spindle $d'$, the latter being flattened or squared, as shown, whereby it may form one member of a drive connection with a drive shaft, as will hereinafter more fully appear. Secured to the frame A by means of a suitable bracket $e$ is a bearing E having a slot $e^2$ extending through the top of the bearing and of sufficient width to receive the spindle $d$ of the take-off roll D. A bearing F is secured on the other side of the frame A by means of a similar bracket $e_r$, the bearing F being for the purpose of supporting the driving spindle $d'$ of the take-off roll. This bearing F is provided with a pair of connected bearing sockets, lettered respectively $f$ and $f'$. Bearing socket $f$ directly opposite roll D when the latter is in position, is of greater width than the inner socket $f'$. The head $g$ of the drive shaft G is journaled within the socket $f$ of greater width and the main portion of the drive shaft rotates within the inner socket $f'$. The end thrust of the roll D is resisted by head $g$ within socket $f$, thereby preventing the drive shaft from being displaced endwise in its bearing. Extending from the upper portion of the bearing socket $f$ and clear through the top of the bearing is a slot $f^2$ less in width than the greater transverse dimension of the flattened spindle $d'$, but slightly greater in width than the lesser transverse dimension of said spindle. Thus, the spindle $d'$ may not be removed from the bearing F, unless the spindle is so positioned that its wider sides are substantially parallel with the sides of slot $f^2$, or, in other words, unless the spindle is placed on end relatively to the slot in the bearing F, as shown more particularly in Fig. 4. In all other positions the spindle $d'$ of the take-off roll is locked in the bearing F.

The head $g$ of drive shaft G is bifurcated, as shown, permitting spindle $d'$ to be interlocked with said drive shaft and to be driven positively by the shaft. Intermittent motion may be applied to shaft G by a sprocket H having a chain connection $h$ with a sprocket H' on the cylinder shaft $c$, so that the take-off roll, when interlocked with the shaft G, as above set forth, will be driven in accord with the cylinder C.

With the above described construction, the take-off roll may be readily dismounted from its bearing by rotating the drive shaft to such position that the inner sides of the bifurcations at the end of the head $g$ are substantially parallel with the sides of slot $f^2$. When the shaft is so positioned relatively to the slot, the spindles at the opposite ends of the take-off roll may be easily and quickly lifted out of their respective bearings; in all other positions the roll is locked in its bearings.

The present invention, however, is particularly concerned with the construction of the take-off roll and also the means for applying a coating of flour, or other analogous drying medium to the dough-engaging surface of the roll. The coating of flour is preferably applied to that portion of the periphery of the roll from which a batch of dough has just been discharged, and before the same portion of the periphery of the roll has been again rotated into position to receive a new batch of dough. As shown, the periphery of the roll D is formed of openwork, thereby securing a dough-engaging surface which is not only most effective to prevent sticking of the dough, but which also may be floured in a very simple and convenient manner, as will hereinafter more fully appear. The dough-engaging periphery of the roll D is constructed of parallel spaced bars D', preferably round in cross section, as shown more particularly in Fig. 6, and secured at their ends to the end plates D² of the roll. The spacing of the several bars D' will be sufficiently wide to permit the ready passage of flour clear through the roll. Positioned underneath the roll D is a flour receptacle or basin I preferably semi-cylindrical in shape and located quite close to the lower portion of the periphery of the roll so that on each rotary movement of the roll a portion of the bars D' will be swept clear through a small quantity of flour placed in the bottom of the basin I. The batches of dough are discharged from the take-off roll above the basin I and, upon the next rotary movement of the roll, those bars from which the dough has just been discharged will be swept through the flour in the basin I. Thus, every part of the dough-engaging surface of the roll will be thoroughly floured before being advanced to the position to receive a new batch of dough. In the event of small particles of dough sticking to the rods D', on the next rotary movement and before being presented again for a new batch of dough, these raw or moist surfaces will be thoroughly dried during the passage of the rods through the flour in the basin I. If desired, the end plates D² of the roll may be provided with openings $d^3$, which permit the roll to be grasped readily by the hands, while removing it from its bearings in the manner fully set forth above.

The flour basin I is preferably so mounted that it may be quickly removed from its position beneath the roll, after the roll has been dismounted, although the flour basin will be locked in position when the roll is mounted in its bearings. For this purpose the bearings E and F are both provided with inclined bearing blocks I', and the end plates of the basin are formed with corresponding inclined bearing sockets I², the latter being designed to fit and engage the bearing blocks I'. The top and side walls of the sockets engage the tops and sides of the bearing blocks and retain the basin on the bearing blocks; the bottoms of the sockets I² are left open permitting the sockets to be readily slipped upwardly and away from the bearing blocks in dismounting the basin. Both the bearing blocks I' and the sockets I² are provided with inclined registering slots $i$ for the reception of the spindles $d$, $d'$ of the roll. Slots $e^2$ and $f^2$ may be similarly inclined from the vertical. It will be noted that the take-off roll, when properly positioned in its bearings also locks the flour basin I in position, since the basin must be removed by lifting it out, and this cannot be effected until the roll D has been dismounted.

What is claimed is:—

1. The combination of a hollow dough advancing roll having its dough-engaging periphery formed of openwork, and a flour receptacle so positioned adjacent the roll that the periphery of the roll will pass clear through the flour placed in the receptacle.

2. The combination of a hollow dough advancing roll having its dough-engaging periphery formed of spaced substantially parallel bars and a flour receptacle so positioned adjacent the roll that the periphery of the roll will pass clear through the flour placed in the receptacle.

3. The combination of a hollow dough advancing roll having its dough-engaging periphery formed of openwork, a flour receptacle so positioned adjacent the roll that the periphery of the roll will pass clear through the flour placed in the receptacle, and means for imparting a rotary movement to the roll.

4. The combination of a hollow dough advancing roll, means for intermittently rotating said roll to one position to receive a batch of dough and to another position to discharge said batch of dough, and a flour receptacle located below the roll and between the discharging and receiving positions of the roll, said flour receptacle being so positioned adjacent the roll that the periphery of the roll will pass clear through the flour placed in the receptacle.

5. The combination of a hollow dough advancing roll having its dough-engaging periphery formed of spaced, substantially parallel bars, means for intermittently rotating said roll to one position to receive a batch of dough and to another position to discharge said batch of dough, and a flour receptacle inclosing the lower portion of the roll and located between the discharging and receiving positions of the roll, said flour receptacle being so positioned adjacent the roll that the periphery of the roll will pass clear through the flour placed in the receptacle.

6. The combination of a hollow dough advancing roll having a dough-engaging periphery formed of openwork, and a flour receptacle located below said roll and adjacent thereto whereby the periphery of the roll will pass clear through the flour placed in the receptacle.

7. The combination of a hollow cylindrical dough advancing roll having a dough-engaging periphery formed of openwork, and a semi-cylindrical flour receptacle of a greater diameter than the dough advancing roll located below said roll, said flour receptacle being positioned adjacent the roll whereby the periphery of the latter will pass clear through the flour placed in the receptacle.

FRANK H. VAN HOUTEN.

Copies of this patent may be obtained for five cents each, by addressing the "Commissioner of Patents, Washington, D. C."